Dec. 19, 1933. T. E. PRAY Re. 19,032
MINING MACHINE
Original Filed Oct. 6, 1930 4 Sheets-Sheet 1
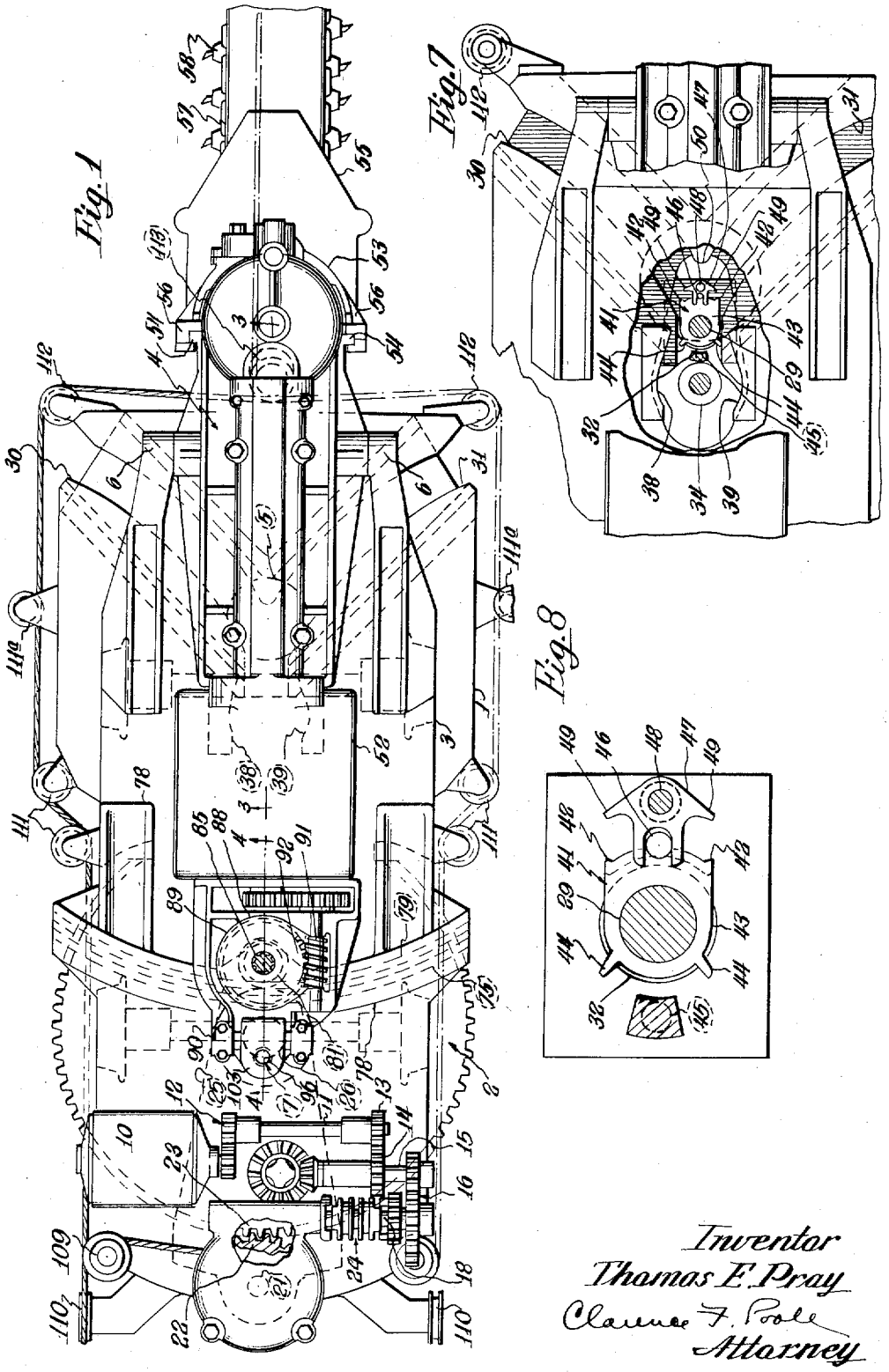
Inventor
Thomas E. Pray
Clarence F. Poole
Attorney Dec. 19, 1933.
T. E. PRAY
Re. 19,032
MINING MACHINE
Original Filed Oct. 6, 1930 4 Sheets-Sheet 2
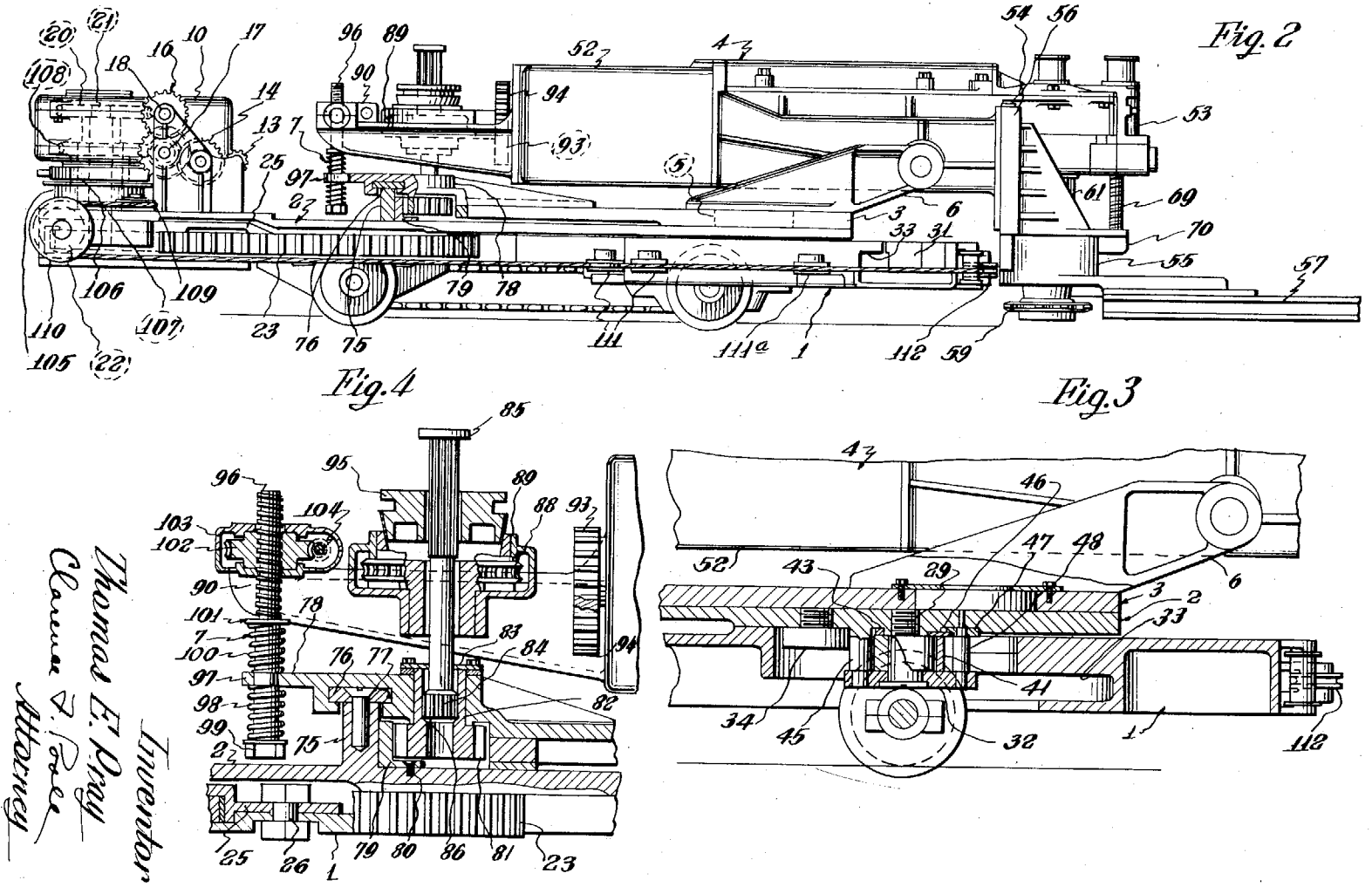
Inventor
Thomas E. Pray
Clarence F. Poole
Attorney Dec. 19, 1933. T. E. PRAY Re. 19,032
MINING MACHINE
Original Filed Oct. 6, 1930 4 Sheets-Sheet 3
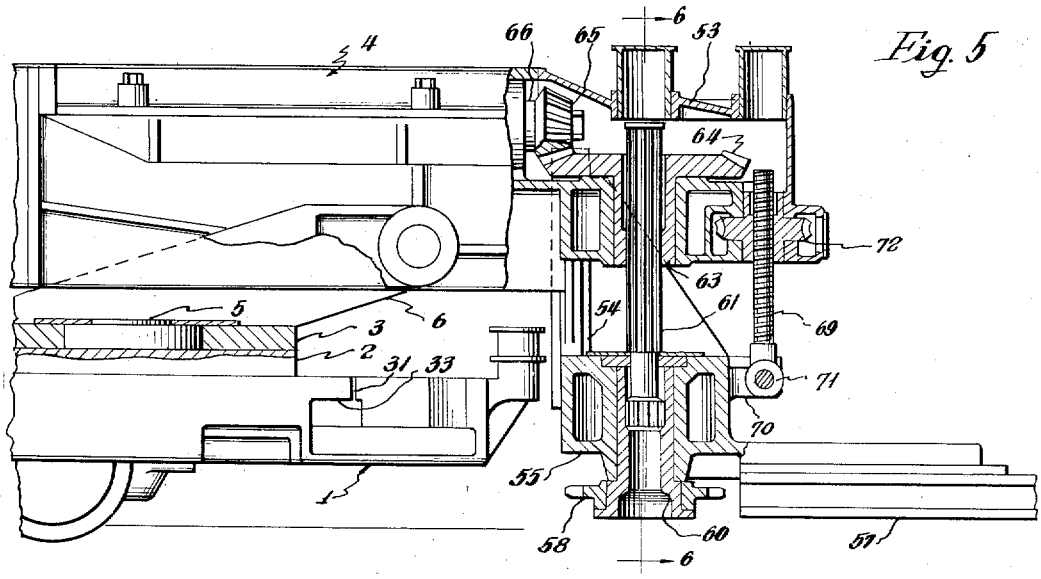
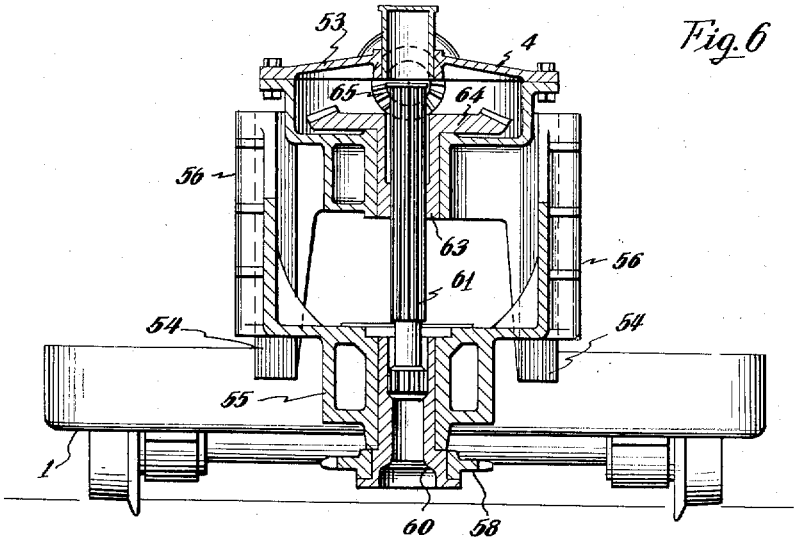
Inventor
Thomas E. Pray
Clarence A. Poole
Attorney Dec. 19, 1933. T. E. PRAY Re. 19,032

MINING MACHINE

Original Filed Oct. 6, 1930 4 Sheets-Sheet 4

Inventor
Thomas E. Pray
Clarence F. Poole
Attorney

Reissued Dec. 19, 1933

Re. 19,032

UNITED STATES PATENT OFFICE 19,032

MINING MACHINE

Thomas E. Pray, Chicago, Ill., assignor to Goodman Manufacturing Company, Chicago, Ill., a corporation of Illinois Original application October 6, 1930, Serial No. 486,549. Renewed January 18, 1932. Original No. 1,908,179, dated May 9, 1933. Application for reissue June 29, 1933. Serial No. 678,200

25 Claims. (Cl. 262—28)

My invention relates to improvements in mining machines and more particularly to a track-mounted mining machine adapted to cut a kerf adjacent the mine bottom or at various elevations with respect thereto.

My invention has among other objects to provide a new and improved mining machine of the class described in which the cutter bar may cut a kerf having a substantially straight face from the track in restricted spaces, such as mine entries, in front of and to each side of the track upon which the machine is mounted adjacent the mine bottom or at various elevations with respect thereto.

Further objects of my invention will appear from time to time as the specification proceeds.

My invention may be more clearly understood with reference to the accompanying drawings wherein:

Figure 1 is a top plan view of the device embodying my invention with parts broken away and in section;

Figure 2 is a side elevation of the device shown in Figure 1 with certain parts broken away and in section;

Figure 3 is a partial enlarged sectional view taken along line 3—3 of Figure 1;

Figure 4 is a partial enlarged sectional view taken along line 4—4 of Figure 1;

Figure 5 is an enlarged fragmentary side elevation of the forward portion of the machine with parts broken away and in section;

Figure 6 is a sectional view taken along line 6—6 of Figure 5;

Figure 7 is a partial enlarged top plan view of the forward portion of the machine with the cutting element broken away and with parts shown in section;

Figure 8 is a sectional view taken along line 8—8 of Figure 3; and

Figure 9:
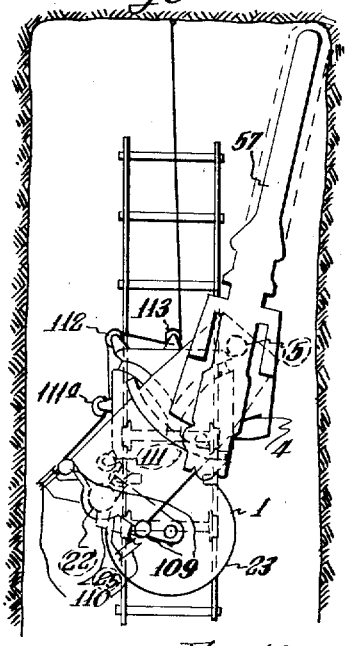
Figure 10:
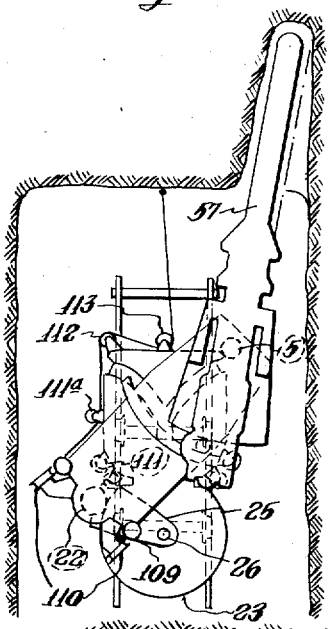
Figure 11:
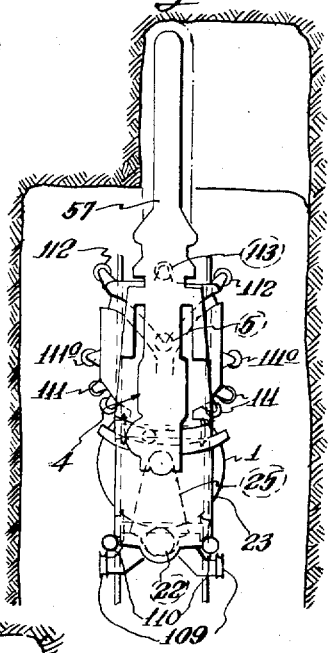
Figure 12:
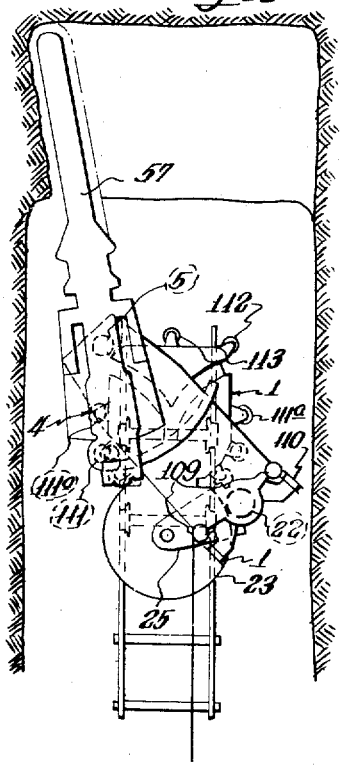
Figure 13:
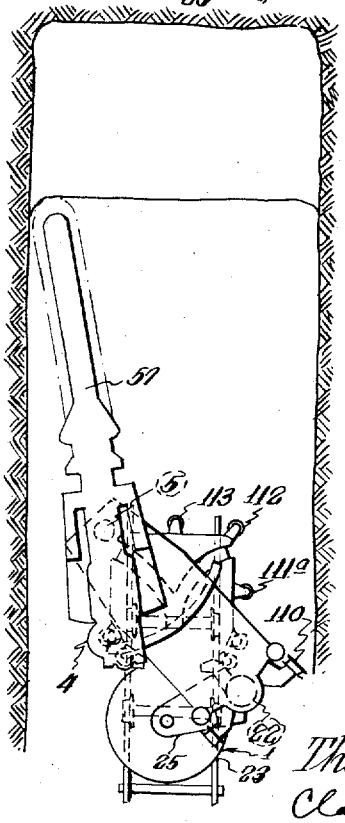

Figures 9, 10, 11, 12, and 13 are diagrammatic views showing the mining machine in various positions during the cutting operation.

Like numerals refer to like parts throughout the several figures.

Referring now in particular to the drawings, the device embodying my invention is shown as a mining machine of the straightface type similar to that disclosed in Patent No. 1,244,178, issued to Charles E. Davis, October 23, 1917, but differs therefrom in that a wider range of movement of the cutting element is provided than is shown in the Davis patent so that the machine may cut in narrow places equally as well as in wide places, and so the machine may cut a kerf below the level of the track in front of and to each side of the track.

As illustrated in the drawings, the machine is made up of four general elements comprising a base frame 1, a feeding frame 2, a pivotal frame 3 mounted thereon for pivotal movement with respect thereto about a vertical axis adjacent the forward end of the feeding frame 2, and a cutting element 4 carried on the pivotal frame 3.

The base frame 1 is preferably mounted upon wheels which run upon a track, which wheels may be power driven in a usual manner, not herein shown or described since it is no part of my invention, for moving the mining machine about the mine from working place to working place or for sumping the cutter bar into the coal. The feeding frame 2 is mounted on the base frame 1 for both angular and longitudinal movement as the machine is making a cut. The pivotal frame 3 is mounted on a stud 5 on the forward portion of the feeding frame 2 for pivotal movement with respect thereto. The cutting element 4 is trunnioned on the pivotal frame 3 beyond the forward end thereof on trunnion supports 6, 6 and is yieldably supported at its rearward end by an adjusting screw 7 for adjusting the angle of said cutting element with respect to the pivotal frame 3.

Referring now in particular to the details of the feeding frame 2 and means for feeding the cutting element 4 to cut a substantially straight face in the mine wall, a motor 10 is mounted on the rear end of the feeding frame 2 and is operatively connected with a transverse shaft 11 by means of a suitable gear train generally indicated at 12. A spur gear 13 is on the opposite end of the transverse shaft 11 from the motor 10 and meshes with and drives a spur gear 14 on a transverse shaft 15. A suitable gear train, generally indicated at 16, drives parallel spaced transverse shafts 17 and 18 from the transverse shaft 15, the shaft 18 being above the shaft 17. A worm and worm gear drive 20 has connection with the shaft 18 and a vertical shaft 21 for driving said shaft from the shaft 18. A spur gear 22 is keyed on the lower end of the shaft 21 and meshes with a circular rack 23 on the rearward portion of the base frame 1. Suitable means are provided for controlling the connection of the worm and worm gear drive 20 to the shaft 18 so said worm and worm gear drive may be selectively connected thereto, which means herein comprise a suitable clutch means of an ordinary construction generally indicated at 24.

A movable connecting device 25 is pivotally connected with the base frame 1 on a vertical stud 26 adjacent the center of the circular rack 23, and with the feeding frame 2 adjacent the rearward end thereof for pivotal movement with respect thereto about the axis of the vertical shaft 21. Thus the movable connecting device serves as a crank to connect the feeding frame 2 with the base frame 1.

The feeding frame 2 is provided with a pivot 29 which has a sliding pivotal connection with the base frame 1 in slots 30 and 31 in the base frame 1. The slots 30 and 31 have their forward ends on the outer forward corners of the base frame 1 and converge towards the central portion of said base frame (see Figs. 1 and 7). Connected with the pivot 29 is a removable holding piece 32 which slides in the slots 30 and 31 and engages recesses 33 in the slots 30 and 31, as shown in Figures 3 and 5, so as to prevent the feeding frame 2 from being lifted upwardly to disengage it from the base frame 1. Thus as the feeding frame 2 is rocked with respect to the base frame 1 and movable connecting device 25 by means of the spur gear 22 and rack 23, the pivot 29 passes along one slot and is switched to the other at the center of the base frame 1.

Suitable switching means are provided which consist of a switching cam 34 connected with the feeding frame back of the pivot 29 at the point where the slots 30 and 31 meet. At the meeting point of the converging slots there are rearwardly projecting engaging faces 38 and 39. As the pivot 29 reaches this central position, the further rocking movement of the feeding frame causes the switching cam 34 to engage one of these faces and switches the pivot 29 from one slot to the other. For example, if the pivot 29 is moving along the slot 30 toward the center, when it reaches the center where the two slots meet, the switching cam 34 engages the face 39. At this point the feeding frame has reached the limit of its backward movement and then begins to move forward and the engagement of the switching cam 34 with the face 39 causes the pivot 29 to be moved to pass into the slot 31. If the pivot 29 is moved in the opposite direction; that is, in the slot 31 and is moving towards the center, when it reaches the center the switching cam 34 engages the face 38 and switches said pivot into the slot 30.

Suitable means are provided to clear the cuttings from the slots 30 and 31 during the cutting operation, which means herein comprise a cleaner 41 placed ahead of the pivot 29. This cleaner has two projecting arms 42 as shown, the ends of which pass along the faces of the slots 30 and 31, and is pivotally mounted upon the pivot 29. This cleaner has connected with it a part 43 provided with lugs 44 adapted to engage a pin 45 so as to limit movement of the cleaner (see Figs. 7 and 8). The cleaner 41 is provided with a projection 46, which is engaged by a controlling device 47, mounted upon a pin 48 which is interposed between the removable holding piece 32 and the feeding frame 2. This controlling device is provided with projecting parts 49 and as the pivot 29 passes from one of the slots 30 or 31 to the other, one of these projecting parts engages a point 50 at the point where the slots 30 and 31 come together and causes the cleaner 41 to be moved so that it extends directly across the slot into which it is then to be moved and thus guides said cleaner into said slot and moves ahead of the pivot 29 so as to clear the respective slot, in which the pivot 29 is moving, of cuttings, dirt, or other material that may be therein.

Referring now in particular to the details of the cutting element 4 and means for moving said cutting element and pivotal frame 3 about the axis of the stud 5, said cutting element is provided with a motor 52, herein preferably shown as an electric motor, at the rearward end thereof, and cutting mechanism forwardly of said motor. The cutting mechanism is of a usual construction so will only be described insofar as is necessary to clearly set forth my invention.

A portion 53 of the cutting element 4 projects forwardly beyond the base frame 1 and has a pair of guides 54 depending therefrom on each side of the longitudinal center line of said cutting element. A cutter head 55 is provided with guides 56 which are adapted to register with the guides 54 and is movable in said guides towards and away from the portion 53 of the cutting element 4. A cutter bar 57 projects forwardly from the cutter head 55 and has a cutter chain 58 movable thereabout. The cutter chain 58 is driven from a sprocket 59 fixed on a sleeve 60 journaled within the cutter head 55 and driven from the motor 52 by means of a splined shaft 61 interposed between said sleeve and the portion 53 of the cutting element 4. The splined shaft 61 is slidable within a hub 63 of a bevel gear 64 journaled within the portion 53 of the cutting element 4 and is driven therefrom. The bevel gear 64 is driven from the motor 52 by means of a bevel pinion 65 on a longitudinal shaft 66 in a usual manner, the details of which driving mechanism are not herein shown since they are no part of my invention.

The cutter head 55 is moved towards and away from the portion 53 and cutting element 4 in the guides 54 in a usual manner which herein comprises a vertically extending screw shaft 69 pivotally mounted on a forward extending ear 70 by means of a pin 71. The screw shaft 69 extends upwardly from the cutter head 55 and is threaded within the hub of a worm gear 72 which in turn is journaled within the portion 53 of the cutting element 4. The worm gear 72 is selectively connectible with the motor 52 for raising and lowering the cutter head 55 in the guides 54 in a usual manner which will not herein be described in detail since it is no part of my invention.

An arcuate guide 75 extends upwardly from the feeding frame 2 rearwardly of the cutting element 4 and has a gib 76 fixed to its top portion in a usual manner (see Figs. 1, 2, and 4). An arcuate groove 77 is provided in the under portion of an upwardly extending portion 78 of the pivotal frame 3. This arcuate groove is engaged by the gib 76 to prevent up and down movement of the pivotal frame 3 with respect to the feeding frame 2. An arcuate rack 79 abuts the forward portion of the arcuate guide 75 and is fixed to the feeding frame 2 by means of machine screws 80 and is engaged by a pinion 81.

The pinion 81 is provided with an upwardly extending hub 82 journaled within the upwardly extending portion 78 of the pivotal frame 3. An annular ring 83 abuts the top portion of the upwardly extending portion 78 of the pivotal frame 3 and is fixed to the upper end of the hub 82 to hold said hub and pinion from vertical movement within the upwardly extending portion 78 of the pivotal frame 3. The inner portion of the hub 82 is splined for a portion of its length and is engaged by a splined end 84 of a vertical shaft 85. A shoulder 86 is provided on the inner surface of the hub 82 to engage the lower end of the vertical shaft 85.

The vertical shaft 85 extends upwardly from the hub 82 and is coaxial with a worm gear 88 journaled on its hub within a worm and worm gear housing 89. The worm and worm gear housing 89 is fixed between support members 90 extending rearwardly from the motor 52 of the cutting element 4.

Means are provided for driving the worm gear 88 from the motor 52 which herein comprises a worm 91 integral with a longitudinally extending shaft 92 journaled within the worm and worm gear housing 89 and meshing with the worm gear 88. The longitudinal shaft 92 and worm 91 are driven from the motor 52 by means of a motor pinion 93 which meshes with and drives a spur gear 94 fixed on the forward end of said longitudinal shaft.

Means are provided for selectively connecting the vertical shaft 85 with the worm gear 88, which means herein comprise a suitable cone clutch of a usual construction, generally indicated at 95, which clutch is splined on the upper portion of the vertical shaft 85. It may thus be seen that when the cone clutch 95 is engaged with the worm gear 88, the pinion 81 is rotated and the pivotal frame 3 and cutting element 4 are moved about the axis of the stud 5.

Thus a means has been provided for moving the cutter bar 57 about the axis of the stud 5 to feed said cutter bar into the coal. This provides an additional means for feeding said cutter bar into the coal and also provides a means for positioning the cutter bar 57 to adjust said cutter bar to various widths of rooms it is desired to cut and for permitting the cutter bar to be positioned to one side or the other of the track below the level of the track. Thus when the feeding frame 2 is in an extreme position on one side of the base frame 1 or the other, the cutter bar 57 may be adjusted so as to cut a narrow room or wide room in a single operation.

The pivotal frame 3 is held in fixed relation with respect to the feeding frame 2 while the cutter bar 57 is being fed across the face of the coal by a suitable holding or locking means of a type well known in the art, a preferred form of said locking means being a pin and aperture lock of a type generally used on mining machines (not shown).

Referring now in particular to the adjusting screw 7 and means for adjusting the angular position of the cutting element 4 with respect to the pivotal frame 3, a vertical shaft 96 is provided. This shaft passes through a lug 97 extending rearwardly from the upwardly extending portion 78 of the pivotal frame 3 and has a suitable compression spring 98 interposed between a nut 99 and the lower portion of the lug 97. Another compression spring 100 is provided between the upper portion of the lug 97 and a collar 101 fixed on the vertical shaft 96. The upper portion of the vertical shaft 96 is threaded and is engaged by threads within the hub of a worm gear 102 journaled within a worm and worm gear housing 103 trunnioned between the outer ends of the support members 90. The worm gear 102 is driven by means of a worm 104, which worm may be rotated by suitable hand operated means to vary the angular position of the cutter bar 57 with respect to the mine bottom in a usual manner.

It should here be noted that ample clearance is provided between the vertical shaft 85 and the hub of the worm gear 88 and that the lower end of said shaft is loosely mounted in the hub 82 for driving said hub to take care of angular movement of the cutting element 4 with respect to the pivotal frame 3 so that the pinion 81 may be driven from the motor 52 in all positions of adjustment of said motor and cutting element with respect to the pivotal frame 3.

While the machine may be sumped into the coal by means of its track wheels where the cutting is soft, I herein show the cutter bar 57 and cutter chain 58 as being sumped into the coal by means of a flexible feeding device in a usual manner. Said flexible feeding device herein comprises a feed drum 105 having a flexible feeding member 106 connected thereto. The feed drum 105 is fixed on a sleeve 107 and is driven from the shaft 17 by means of a worm and worm gear drive, generally indicated at 108, in a usual manner which is not herein shown in detail since it is no part of my invention. A sheave 109 is provided on each side of the feeding frame 2 near the rearward end thereof in alignment with the forward portion of the feed drum 105. Sheaves 110 are mounted rearwardly of the sheaves 109 and on each side of the feeding frame 2 and are rotatable about a horizontal transverse axis. Another pair of sheaves 111 are provided on each side of the base frame 1 beneath the feeding frame 2 and rearwardly of the front track wheels. These sheaves are rotatable about a vertical axis and the flexible feeding member 106 is adapted to pass around the sheave 109, rearwardly and around the sheave 110, forwardly around one sheave 111 on the inner side thereof and around the other sheave 111 on the outer side thereof to a sheave 112 on the outer forward corner of the base frame 1, around said sheave to a sheave 113 in a central portion of said base frame. The sheaves 112 are provided on each side of the forward end of the base frame 1 so that a flexible feeding member may be threaded around either side of said base frame. Sheaves 111*a* are provided on each side of the base frame 1 intermediate the sheaves 111 and 112 to provide a means for threading the flexible feeding member forwardly of the machine when the feeding frame is in an extreme position on either side of the circular rack 23. From the sheave 113, the flexible feeding member 106 is adapted to extend forwardly and have its end attached to a jack or any other holding device adjacent the coal face.

It may thus be seen that when power is applied to the feed drum 105 to wind the flexible feeding member thereon, and when the cutter chain 58 is moving about the cutter bar 57 and the end of the flexible feeding member 106 is fixed adjacent the coal face, that said member will move the cutter bar 57 and cutter chain 58 under the coal.

Referring now in particular to Figures 9 to 13, inclusive, and the use and operation of the machine embodying my invention, the feeding frame 2 is positioned so that the pivot 29 is in an extreme forward position in the slot 31 and so that the rearward end of said feeding frame overhangs from the opposite side of said machine. The cutter bar 57 is then positioned so that its forward end is adjacent the right hand forward corner of the working face when cutting from right to left to one side of the mine track. Positioning of the cutter bar is effected by moving the pivotal frame 3 about the axis of the stud 5 by means of the driving pinion 81 driven from the motor 52, which pinion meshes with the arcuate rack 79 and thus causes pivotal movement of the pivotal frame 3 in the manner which has hereinbefore been described. When it is desired to cut adjacent the mine bottom in front of the track, the cutter bar 57 is lowered to a position below the level of the track by means of the screw shaft 69 after it has been positioned to one side thereof by the pivotal frame 3 in a manner which has before been described. The flexible feeding member 106 is then threaded from the feed drum 105 around the sheaves 109, 110, 111*a*, 112, and 113 to a jack adjacent the coal face, and the cutter chain 58 is driven about the cutter bar 57. This feeding member is then wound on the drum 105 to move the machine along the track and sump the cutter bar 57 and cutter chain 58 into the coal. When the cutter bar 57 has been sumped into the coal to the desired depth, the pivotal frame 3 is moved about its axis of pivotal connection to the feeding frame 2 so said cutter bar may extend generally longitudinally with respect to said feeding frame. The pivotal frame 3 is then locked in such a position in a suitable manner. Power is then applied to the spur gear 22 which moves the movable connecting device 25 about the circular rack 23, which connecting device in turn moves the feeding frame 2 in the converging slots 30 and 31 and causes the stud 5, to which the pivotal frame 3 is pivoted, to be moved angularly and laterally across the base frame 1. This in turn moves the forward end of the cutter bar 57 in such a manner that the forward end of said cutter bar may cut a kerf which is substantially straight (see Figs. 11 and 12).

When the cutter bar reaches the extreme left hand corner of the working face, the pivotal frame 3 is unlocked from the feeding frame 2 and said pivotal frame is pivotally moved about its axis of pivotal connection to the feeding frame 2 until the cutter bar 57 is positioned so it may be withdrawn from the kerf to the opposite side of the mine track and cut a relatively straight kerf as it is being withdrawn. The cutter bar 57 is then removed from the coal face by means of the flexible feeding member 106 which is attached to a jack or any other suitable holding device rearwardly of the machine.

It may now be seen that the initial cutting position of the cutter bar 57 may be adjusted by means of moving the pivotal frame 3 about the axis of the stud 5 so that the machine may be adapted to cut in either wide or narrow places so said cutter bar may be positioned to one side or the other of the track below the level of the track adjacent the mine bottom, and that a new and improved form of mining machine is provided which is adapted to cut a kerf in the mine wall having a straight face at the mine bottom or at various elevations with respect thereto, which machine is so arranged as to take up a minimum amount of lateral space and efficiently cut in narrow entries.

It will be observed further that, in its broadest aspects, the movement of the feeding frame 2 is such that the extreme end of the cutter bar is made to describe an arc, the radius of which is much greater than could be afforded if such feeding frame were pivoted about a fixed point on the mining machine itself. This movement of the feeding frame 2 is obtained by swinging the feeding frame about a pivot which is always movable simultaneously with the lateral swinging movement of said frame. The movement of said pivot is so controlled or guided that the extreme end of the cutter bar moves in a substantially straight line or, in other words, in an arc of which the radius is substantially of infinite length. The mechanism shown for this purpose in the present application is similar to that shown in the Davis Patent No. 1,244,179 in which the pivot 47*a* is moved in the converging slots 48 and 49. It is manifest, however, that equivalent means may be employed for affording this controlled movement of the pivot point, some of which other means are disclosed in Patents Nos. 1,244,179, 1,283,688, and 1,321,290, to C. E. Davis.

As an improvement over the devices disclosed in the several Davis patents above referred to, it will be noted that I provide an additional pivotal connection between the feeding frame 2 and the cutting element 4, which pivotal point is located within the boundary of the machine when the longitudinal center line of the feeding and base frames coincide. This pivotal point moves from a point adjacent one forward corner of the machine inwardly toward the center thereof and thence outwardly toward the opposite forward corner of the machine during cutting across the face and is spaced a substantial distance from the depending portion of the cutter arm, thus making it possible for said depending arm to be dropped below the level of the track in narrow working places both at the front and both sides of said track during the cutting operation.

While I have herein shown and described one form of my invention, it will be understood that the construction and arrangement of the various parts may be altered without departing from the spirit and scope thereof. Furthermore, I do not wish to be construed as limiting myself to the specific form illustrated, excepting as it may be specifically limited in the appended claims.

I claim as my invention:

1. In a mining machine, a base frame, a feeding frame mounted thereon for lateral swinging movement with respect thereto about a pivotal axis movable simultaneously with swinging movement of said feeding frame, a pivotal frame mounted on said feeding frame for pivotal movement with respect thereto about a vertical axis independent of movement of said feeding frame, and a projecting cutting element mounted on said pivotal frame including a chain carrying cutter bar, said cutter bar being moved by said feeding frame so that its forward end moves in a path of a greater radius than the length of the machine and cutter bar, for cutting a horizontal kerf.

2. In a track-mounted mining machine, a base frame, a feeding frame mounted thereon for lateral swinging movement with respect thereto about a pivotal axis movable simultaneously with swinging movement of said feeding frame so that a forwardly projected point remote therefrom will describe a generally straight line extending transversely of the forward end of the machine, a pivotal frame mounted on said feeding frame for pivotal movement with respect thereto about a vertical axis independent of movement of said feeding frame, and a cutting element mounted on said pivotal frame having a chain carrying cutter bar extending forwardly therefrom for cutting a generally straight kerf in the mine wall.

3. In a track-mounted mining machine, a base frame, a feeding frame mounted thereon for lateral swinging movement with respect thereto about a pivotal axis movable simultaneously with swinging movement of said feeding frame so that a forwardly projected point remote therefrom will describe a generally straight line extending transversely of the forward end of the machine, a pivotal frame mounted on said feeding frame for pivotal movement with respect thereto about a vertical axis independent of movement of said feeding frame, and a cutting element mounted on said pivotal frame having a chain carrying cutter bar depending therefrom and extending forwardly therefrom for cutting a generally straight kerf in the mine wall adjacent the mine bottom.

4. In a track-mounted mining machine, a base frame, a feeding frame mounted thereon for lateral swinging movement with respect thereto about a pivotal axis movable in a predetermined path simultaneously with swinging movement of said feeding frame, a pivotal frame mounted on said feeding frame for pivotal movement with respect thereto about a vertical axis adjacent the forward central portion of said feeding frame, a cutting element on said pivotal frame and extending forwardly therefrom including a motor and cutting mechanism forwardly of said motor including a forward portion overhanging said base frame and a cutter head movable toward and away from said overhanging forward portion having a chain carrying cutter bar extending forwardly therefrom.

5. In a track-mounted mining machine, a base frame, a feeding frame mounted thereon for pivotal movement with respect to said base frame, a pivotal frame mounted on said feeding frame for pivotal movement with respect thereto about a vertical axis adjacent the forward central portion of said feeding frame and within the limits of said base frame when the longitudinal center line of said feeding frame is substantially in alignment with the longitudinal center line of said base frame, a cutting element trunnioned on said pivotal frame and extending forwardly therefrom including a motor and cutting mechanism forwardly of said motor including a forward portion overhanging said base frame, and a cutter head movable towards and away from said overhanging forward portion having a chain carrying cutter bar extending forwardly therefrom, and means rearwardly of said motor and driven therefrom for moving said pivotal frame about its axis of pivotal connection to said feeding frame.

6. In a track-mounted mining machine, a base frame, a feeding frame mounted thereon for pivotal movement with respect to said base frame, a pivotal frame mounted on said feeding frame for pivotal movement with respect thereto about a fixed vertical axis adjacent the forward central portion of said feeding frame, and within the limits of said base frame when the longitudinal center line of said feeding frame is in alignment with the longitudinal center line of said base frame, a cutting element trunnioned on said pivotal frame and extending forwardly therefrom including a motor, cutting mechanism forwardly of said motor and driven from the forward end of said motor including a forward portion overhanging said base frame, a cutter head movable towards and away from said overhanging forward portion having a chain carrying cutter bar extending forwardly therefrom, an arcuate rack on said feeding frame rearwardly of said motor, and means driven from the rearward end of said motor and having operative connection with said arcuate rack for moving said pivotal frame and cutting element about the axis of pivotal connection of said pivotal frame to said feeding frame.

7. In a track-mounted mining machine adapted to cut a kerf at the mine bottom or at various elevations with respect thereto, a base frame, a cutting element extending forwardly from said base frame including a motor and cutting mechanism forwardly of said motor including a forward portion overhanging said base frame, a cutter head movable towards and away from said overhanging forward portion having a chain carrying cutter bar extending forwardly therefrom, a feeding frame mounted on said base frame for movement with respect thereto about a movable pivotal axis so as to cause the outer end of the cutter bar to cut a face of a greater radius than the length of the machine and cutter bar itself, and means for supporting said cutting element on said feeding frame for pivotal movement with respect thereto about a vertical axis comprising a pivotal frame having pivotal connection with said feeding frame adjacent the forward portion of said feeding frame and within the limits of said base frame when the longitudinal axis of said feeding frame coincides with the longitudinal axis of said base frame.

8. In a track-mounted mining machine, a base frame, a feeding frame mounted thereon for swinging movement with respect thereto about a pivotal axis, a pivotal frame mounted on said feeding frame for pivotal movement with respect thereto about a vertical axis adjacent the forward end of said feeding frame and disposed within the limits of said base frame when the longitudinal axis of said feeding frame is in alignment with the longitudinal axis of said base frame, a cutting element on said pivotal frame including a projecting cutter bar adapted to cut a kerf adjacent the mine bottom, and means for independently pivotally moving said pivotal frame about its axis of pivotal connection to said feeding frame for adjusting the position of said cutter bar with respect to said feeding frame and face of the working place for positioning said cutter bar for cutting along the mine bottom in front of and to each side of the mine track.

9. In a mining machine, a track-mounted base frame, a feeding frame mounted thereon for swinging movement with respect thereto about a pivotal axis, a pivotal frame mounted on said feeding frame for pivotal movement with respect thereto about a vertical axis adjacent the forward end of said feeding frame and disposed within the limits of said base frame when the longitudinal axis of said feeding frame is in alignment with the longitudinal axis of said base frame, a depending chain carrying cutter bar extending from said pivotal frame for cutting a kerf adjacent the mine bottom, power operated means for moving said feeding frame with respect to said base frame and moving the axis of pivotal movement of said pivotal frame in an arcuate path with respect to said base frame and other power operated means for independently pivotally moving said pivotal frame about its axis of pivotal connection to said feeding frame.

10. In a track-mounted mining machine, a base frame, a feeding frame mounted thereon for pivotal movement with respect thereto about a movable pivotal axis, a pivotal frame mounted on said feeding frame for pivotal movement with respect thereto about a vertical axis disposed adjacent the forward end thereof, a cutting element on said pivotal frame including a chain carrying cutter bar adapted to cut a kerf to each side of and across the front of the track adjacent the mine bottom, and power operated means for moving said feeding frame laterally across the forward end of said base frame and moving the forward end of said cutter bar in a generally straight line extending transversely of the forward end of said base frame.

11. In a track-mounted mining machine, a base frame, a feeding frame mounted thereon for movement with respect thereto, a pivotal frame mounted on said feeding frame for pivotal movement with respect thereto about a vertical axis disposed adjacent the forward end thereof, a cutting element on said pivotal frame including a chain carrying cutter bar adapted to cut a kerf to each side of and across the front of the track adjacent the mine bottom, means for feeding said feeding frame laterally across the forward end of said base frame about a movable pivotal axis and moving the forward end of said cutter bar in a substantially straight path across the forward end of said base frame, and means for pivotally moving said pivotal frame with respect to said feeding frame for permitting the positioning of said cutter bar adjacent the mine bottom to one side of the mine track for cutting along the mine bottom to each side of and across the front of the track.

12. In a track-mounted mining machine, a base frame, a feeding frame mounted thereon for swinging movement with respect thereto about a pivotal axis simultaneously movable in a predetermined path, a pivotal frame mounted on said feeding frame for pivotal movement with respect thereto about a vertical axis disposed adjacent the forward end thereof, a cutting element mounted on said pivotal frame for cutting a kerf adjacent the mine bottom in front of and to each side of the mine track, means for swinging said feeding frame about said movable pivotal axis simultaneously with movement of said pivotal axis for moving said feeding frame across the front of said base frame and moving the forward end of said cutting element in a substantially straight line with respect to said base frame across the forward end thereof and means for pivoting said pivotal frame with respect to said feeding frame.

13. In a track-mounted mining machine, a base frame, a feeding frame mounted thereon for angular movement with respect thereto, a pivotal frame mounted on said feeding frame for pivotal movement with respect thereto about a vertical axis within the limits of said base frame when the longitudinal axis of said base and feeding frames are in alignment with each other, a cutting element mounted on said pivotal frame for cutting a kerf adjacent the mine bottom in front of and to each side of the mine track, means for pivoting said pivotal frame with respect to said feeding frame and other means for angularly moving said feeding frame laterally across the front of said base frame in such a manner that the axis of pivotal movement of said pivotal frame subscribes two arcs and the forwardmost point of said cutter bar subscribes a substantially straight line.

14. In a mining machine, a base frame, a feeding frame mounted thereon for movement in two converging slots, a pivotal frame mounted on said feeding frame for pivotal movement with respect thereto about a vertical axis, and a projecting cutting element mounted on said pivotal frame having a cutter bar extending forwardly therefrom for cutting a horizontal kerf in the mine wall.

15. In a mining machine, a base frame, a feeding frame mounted thereon for movement in two converging slots, a pivotal frame mounted on said feeding frame for pivotal movement with respect thereto about a vertical axis, and a projecting cutting element mounted on said pivotal frame for cutting a generally straight kerf in the mine wall adjacent the mine bottom in front of said base frame.

16. In a mining machine, a base frame, a feeding frame mounted thereon for movement in two converging slots, a pivotal frame mounted on said feeding frame for pivotal movement with respect thereto about a vertical axis and a cutting element trunnioned on said pivotal frame having a depending cutter bar extending forwardly therefrom for cutting a kerf in the mine wall adjacent the mine bottom.

17. In a track-mounted mining machine, a base frame, a feeding frame mounted thereon for movement in two converging slots, a pivotal frame mounted on said feeding frame for pivotal movement with respect thereto about a vertical axis, and a cutting element mounted on said pivotal frame having a chain carrying cutter bar extending forwardly therefrom for cutting a generally straight kerf in the mine wall adjacent the mine bottom.

18. In a track-mounted mining machine, a base frame, a feeding frame mounted thereon for movement in two converging slots, a pivotal frame mounted on said feeding frame for pivotal movement with respect thereto about a vertical axis and a cutting element trunnioned on said pivotal frame having a depending cutter bar extending forwardly therefrom for cutting a kerf in the mine wall adjacent the mine bottom.

19. In a track-mounted mining machine, a base frame, a feeding frame mounted thereon for movement in two converging slots in said base frame, a pivotal frame mounted on said feeding frame for pivotal movement with respect thereto about a vertical axis adjacent the forward end of said feeding frame, and a cutting element mounted on said pivotal frame and extending forwardly from said base frame for cutting a substantially straight kerf in the mine wall at various elevations with respect thereto.

20. In a track-mounted mining machine, a base frame, a feeding frame mounted thereon for movement in two converging slots in said base frame, a pivotal frame mounted on said feeding frame for pivotal movement with respect thereto about a vertical axis adjacent the forward central portion of said feeding frame, a cutting element trunnioned on said pivotal frame and extending forwardly therefrom including a motor, a cutting mechanism forwardly of said motor and driven from the forward end of said motor including a forward portion overhanging said base frame, a cutter head movable towards and away from said overhanging forward portion having a chain carrying cutter bar extending forwardly therefrom, and means rearwardly of said motor and driven from the rearward end thereof for moving said pivotal frame about its vertical axis.

21. In a track-mounted mining machine adapted to cut a kerf in the mine bottom or at various elevations with respect thereto, a base frame, a cutting element extending forwardly from said base frame including a motor and cutting mechanism forwardly of said motor including a forward portion overhanging said base frame, a cutter head movable towards and away from said overhanging forward portion having a chain carrying cutter bar extending forwardly therefrom, a feeding frame mounted on said base frame for movement in two converging slots in said base frame, and means for supporting said cutting element on said feeding frame for pivotal movement with respect thereto about a vertical axis comprising a pivotal frame having pivotal connection with said feeding frame.

22. In a track-mounted mining machine adapted to cut a kerf at the mine bottom or at various elevations with respect thereto, a base frame, a cutting element extending forwardly from said base frame including a motor and cutting mechanism forwardly of said motor including a forward portion overhanging said base frame, a cutter head movable towards and away from said overhanging forward portion having a chain carrying cutter bar extending forwardly therefrom in fixed relation with respect thereto, a feeding frame mounted on said base frame for angular movement in two converging slots in said base frame, and means for supporting said cutting element on said feeding frame for pivotal movement with respect thereto about a vertical axis comprising a pivotal frame supported on said feeding frame and having pivotal connection with said feeding frame adjacent the forward end thereof.

23. In a track-mounted mining machine adapted to cut a kerf at the mine bottom or at various elevations with respect thereto, a base frame, a cutting element extending forwardly from said base frame including a motor and cutting mechanism forwardly of said motor including a forward portion overhanging said base frame, a cutter head movable towards and away from said overhanging forward portion having a chain carrying cutter bar extending forwardly therefrom, a feeding frame mounted on said base frame for movement in two converging slots in said base frame, a trunnion support for said cutting element extending forwardly of said feeding frame for supporting said cutting element for pivotal movement with respect to said feeding frame about a transverse axis, and means for supporting said trunnion support and cutting element on said feeding frame for pivotal movement with respect thereto about a vertical axis comprising a pivotal frame supported on said feeding frame and having pivotal connection therewith.

24. In a track-mounted mining machine adapted to cut a kerf at the mine bottom or at various elevations with respect thereto, a base frame, a cutting element extending forwardly from said base frame including a motor and cutting mechanism forwardly of said motor including a forward portion overhanging said base frame, a cutter head movable towards and away from said overhanging forward portion having a chain carrying cutter bar extending forwardly therefrom, a feeding frame mounted on said base frame for movement in two converging slots in said base frame, a trunnion support for said cutting element extending forwardly of said feeding frame for supporting said cutting element for pivotal movement with respect to said feeding frame about a transverse axis, and means for supporting said trunnion support and cutting element on said feeding frame for pivotal movement with respect thereto about a vertical axis adjacent the forward end of said feeding frame comprising a pivotal frame supported on said feeding frame and having pivotal connection therewith.

25. In a track-mounted mining machine adapted to cut a kerf at the mine bottom or at various elevations with respect thereto, a base frame, a cutting element extending forwardly from said base frame including a motor and cutting mechanism forwardly of said motor including a forward portion overhanging said base frame, a cutter head movable towards and away from said overhanging forward portion having a chain carrying cutter bar extending forwardly therefrom in fixed relation with respect thereto, a feeding frame mounted on said base frame for angular movement in two converging slots in said base frame, and means for supporting said cutting element on said feeding frame for pivotal movement with respect thereto about a vertical axis comprising a pivotal frame supported on said feeding frame and having pivotal connection with said feeding frame adjacent the forward end thereof.

THOMAS E. PRAY.